(12) United States Patent
Boast

(10) Patent No.: US 10,086,520 B2
(45) Date of Patent: Oct. 2, 2018

(54) CONTROLLED ATMOSPHERE WORKSTATION

(71) Applicant: Don Whitley Scientific Limited, West Yorkshire (GB)

(72) Inventor: David Boast, West Yorkshire (GB)

(73) Assignee: Don Whitley Scientific Limited, West Yorkshire (GB)

( * ) Notice: Subject to any disclaimer, the term of this patent is extended or adjusted under 35 U.S.C. 154(b) by 835 days.

(21) Appl. No.: 14/178,471

(22) Filed: Feb. 12, 2014

(65) Prior Publication Data
US 2014/0232248 A1    Aug. 21, 2014

(30) Foreign Application Priority Data
Feb. 19, 2013   (GB) .................................. 1302880.8

(51) Int. Cl.
*B25J 21/02*   (2006.01)
*B01L 1/02*   (2006.01)

(52) U.S. Cl.
CPC .............. *B25J 21/02* (2013.01); *B01L 1/025* (2013.01); *B01L 2200/141* (2013.01); *B01L 2200/146* (2013.01); *B01L 2300/022* (2013.01)

(58) Field of Classification Search
CPC ..... B25J 21/02; B01L 1/025; B01L 2200/141; B01L 2200/146; B01L 2300/022
USPC .......................... 454/49, 56, 187, 193; 312/1
See application file for complete search history.

(56) References Cited

U.S. PATENT DOCUMENTS

| 2,695,605 | A | * | 11/1954 | Gibbon | .................. A61G 11/00 251/9 |
| 3,051,163 | A | * | 8/1962 | Trexler | .................... B25J 21/02 135/115 |
| 3,337,279 | A | * | 8/1967 | Reinhardt | ................ B25J 21/02 2/270 |
| 3,356,254 | A | * | 12/1967 | Becker | ..................... B25J 21/02 2/270 |

(Continued)

FOREIGN PATENT DOCUMENTS

JP    H03247266 A    11/1991

OTHER PUBLICATIONS

Search Report from the Intellectual Property Office of Great Britain for Application No. GB1302880.8 dated Aug. 1, 2014 (2 pages).

*Primary Examiner* — Gregory Huson
*Assistant Examiner* — Dana Tighe
(74) *Attorney, Agent, or Firm* — Michael Best & Friedrich LLP

(57) ABSTRACT

There is provided a method for initiating a sleeve evacuation process in a controlled atmosphere workstation that comprises a chamber, at least one porthole that may be opened for enabling a user to access the chamber, and a sleeve secured to the least one porthole. The method involves placing the hand of a user within the sleeve with the sleeve engaging the forearm of the user, and initiating the sleeve evacuation process in response to the hand and forearm within the sleeve. In an embodiment of the invention the user forms a fist and moves the fist towards the porthole. This creates a pressure increase that can be detected to initiate the evacuation process. Alternatively the user may wear on his or her hand or forearm an element such as a magnetic element or an RFID chip that can be detected at the porthole to begin the evacuation process.

4 Claims, 7 Drawing Sheets

(56) References Cited

U.S. PATENT DOCUMENTS

| | | | | |
|---|---|---|---|---|
| 3,907,389 A | * | 9/1975 | Cox | B01L 1/02 |
| | | | | 312/1 |
| 4,689,571 A | * | 8/1987 | Yonezu | H01M 10/484 |
| | | | | 324/432 |
| 5,861,305 A | * | 1/1999 | Silley | B25J 21/02 |
| | | | | 312/1 |
| 6,100,083 A | * | 8/2000 | Coy | C12M 41/34 |
| | | | | 312/1 |

* cited by examiner

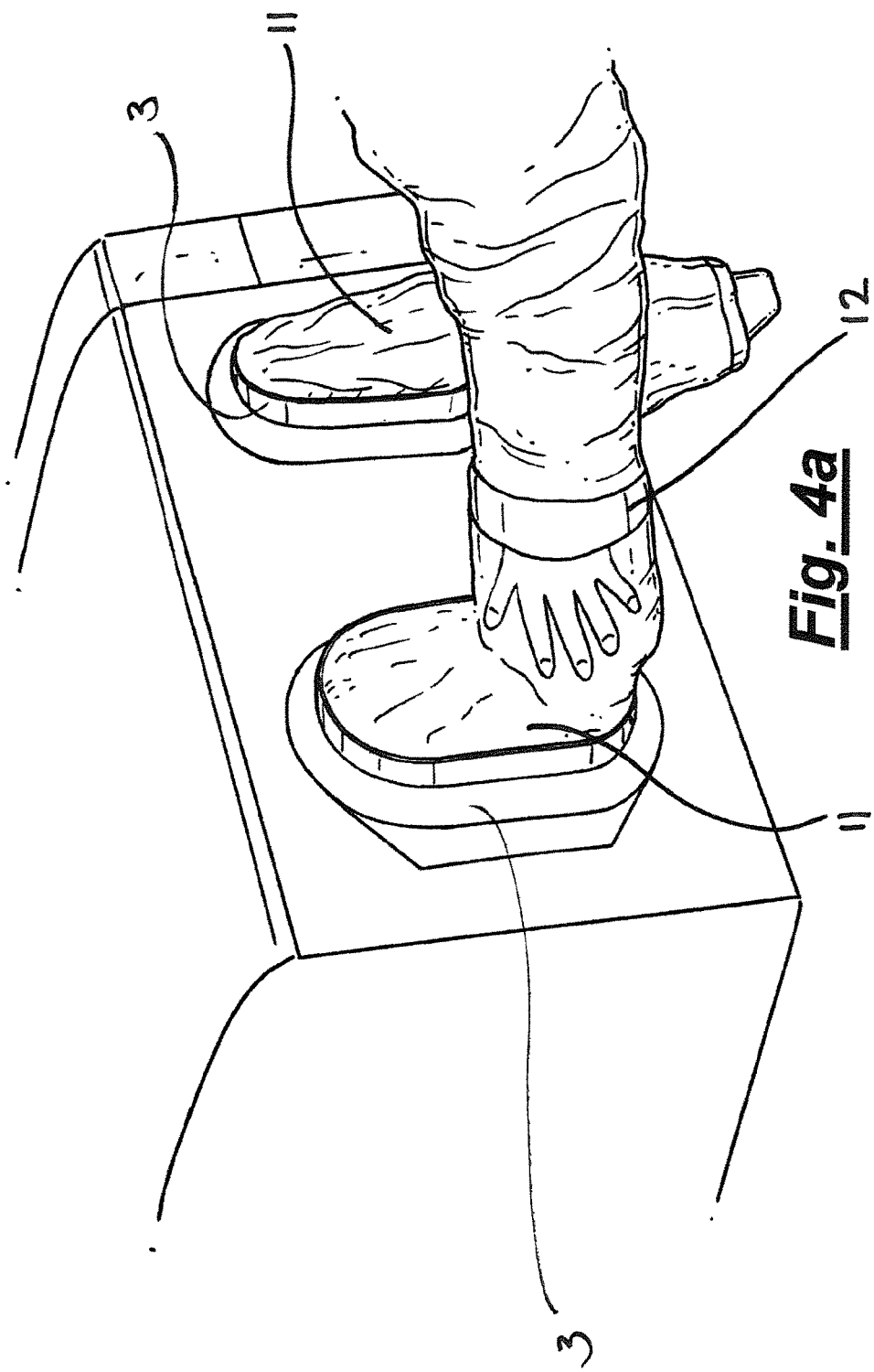

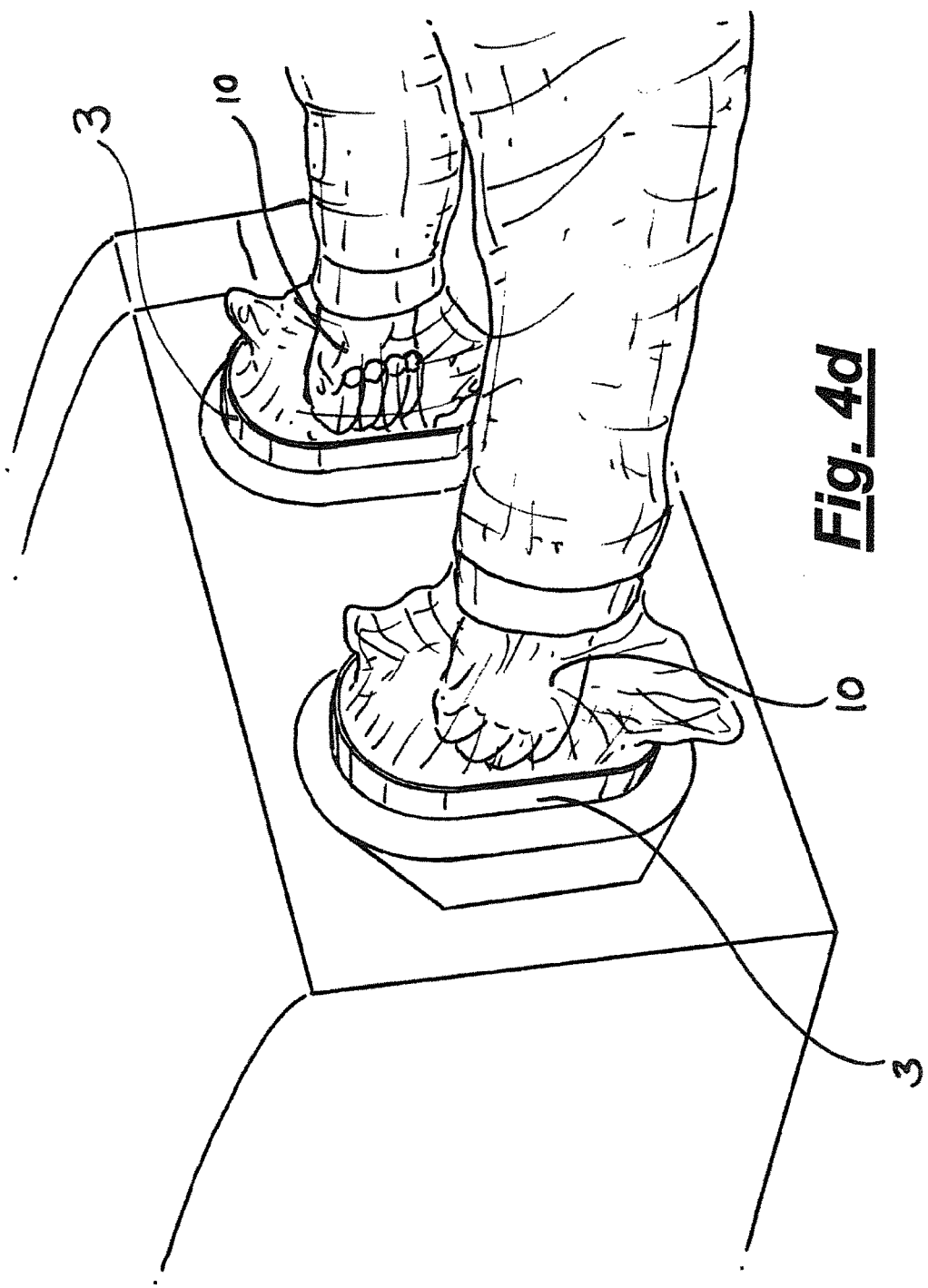

US 10,086,520 B2

CONTROLLED ATMOSPHERE WORKSTATION

FIELD OF THE INVENTION

This invention relates to a controlled atmosphere workstation such as, for example, an anaerobic workstation such as used or intended for use in microbiological laboratories. In particular the invention relates to a method for initiating a sleeve evacuation process and to a workstation designed to operate such a method.

BACKGROUND OF THE INVENTION

A controlled atmosphere workstation provides a workstation in which microbiological experiments can be performed in a controlled atmosphere. Generally the atmosphere will differ in some form—usually in composition and in particular in the amount of oxygen—from ambient conditions and in such cases the controlled atmosphere may be considered a modified atmosphere. An anaerobic workstation, for example, will have an oxygen content that is reduced compared with ambient conditions possibly down to zero or as close to zero as can practically be achieved. In addition to gas contents, the temperature, humidity and pressure of the atmosphere within the workstation can also be controlled.

PRIOR ART

To perform meaningful microbiological experiments in such a workstation it is necessary for a user to be able to use their hands within the workstation in order to perform various actions. To this end a workstation is normally provided with a number of access ports—usually at least two—through which an arm can be inserted and which are designed to allow a user to insert his or her arm into the workstation and then subsequently withdraw the arm without allowing ambient air into the workstation compromising conditions inside the workstation, and without allowing the atmosphere within the workstation to escape to atmosphere in an uncontrolled manner. In other words the access ports must be designed so that the seal between the ambient atmosphere and the modified atmosphere in the workstation is not broken when a user inserts and removes an arm.

One known way of achieving this is to use a sleeve which is fixed in a sealed manner to the access port and into which a user inserts his arm. In such a design after a user inserts his/her arm into the sleeve and before the access port can be opened, air must be extracted from within the sleeve and optionally replaced with either a neutral gas or with the same gas that supplies the workstation itself. Optionally this gas extraction/refilling cycle may be carried out twice or more before the access port itself can be opened in order to minimise any risk of compromising internal environmental conditions.

This extraction/refilling cycle can of course only be carried out once a user's arm is in the sleeve, and since a user will generally be inserting both arms through respective sleeves the user will normally have no hand free to press any button to start the process. It is therefore conventional to provide one or more foot-operated switches that initiate the gas extraction/refilling cycle(s). Such foot-operated switches may be connected by a cable to the workstation control means or may operate wirelessly. However, wireless operation can be problematic in some laboratories where there may be restrictions on the use of wireless technologies to prevent electrical interference, and whether the foot-operated switches are wireless or wired they represent additional cost. Some users find foot switches inconvenient, may not like them and may not operate them correctly.

SUMMARY OF THE INVENTION

According to the present invention there is provided a controlled atmosphere workstation comprising, a chamber, at least one porthole that may be opened for enabling a user to access the chamber, a sleeve secured to the said at least one porthole, said sleeve being adapted in use to receive the hand and of a user and to engage the forearm of a user, and a system for evacuating the sleeve prior to opening the porthole, wherein operation of said sleeve evacuation system is initiated by said hand within the sleeve.

Preferably operation of the sleeve evacuation system is initiated by movement of the hand towards the porthole.

In a preferred embodiment of the invention the workstation comprises means for detecting changes in air pressure in the vicinity of the porthole, and wherein the sleeve evacuation system is initiated by detecting a change in the pressure. Preferably the sleeve evacuation system is initiated by detecting a change in the pressure above a predetermined level and/or within a predetermined time interval.

In other embodiments of the invention the sleeve evacuation system is initiated by detecting the presence of the hand at the porthole. This may, for example, be done by detecting at the porthole an element worn on the hand or arm of a user. This element may, for example, be an RFID element, and an RFID sensor may be provided at the porthole. Alternatively the element may be a magnetic element, and a magnetic sensor may be provided at the porthole.

According to another aspect of the present invention there is provided a method for initiating a sleeve evacuation process in a controlled atmosphere workstation comprising a chamber, at least one porthole that may be opened for enabling a user to access the chamber, and a sleeve secured to the at least one porthole, the method comprising placing the hand of a user within the sleeve with the sleeve engaging the forearm of the user, and initiating the sleeve evacuation process in response to the hand and forearm within the sleeve.

Preferably the sleeve evacuation process is initiated by movement of the hand towards the at least one porthole. For example, the sleeve evacuation process is initiated by detecting a pressure change in the vicinity of the porthole when said hand is moved towards said at least one porthole. Preferably the sleeve evacuation system is initiated by detecting a change in pressure above a predetermined level and/or within a predetermined time interval.

In other embodiments of the invention the sleeve evacuation system is initiated by detecting the presence of the hand at the porthole. For example the sleeve evacuation system may be initiated by detecting an element worn on the hand or forearm of a user. Such an element may be an RFID element with an RFID sensor provided at the porthole, or the element may be a magnetic element with a magnetic sensor provided at said porthole.

BRIEF DESCRIPTION OF THE DRAWINGS

Some embodiments of the invention will now be described by way of example and with reference to the accompanying drawings, in which:

FIGS. 4(a) to 4(d) illustrate the sequence of operation of an embodiment of the invention.

DETAILED DESCRIPTION OF PREFERRED EMBODIMENTS

Figure 1:
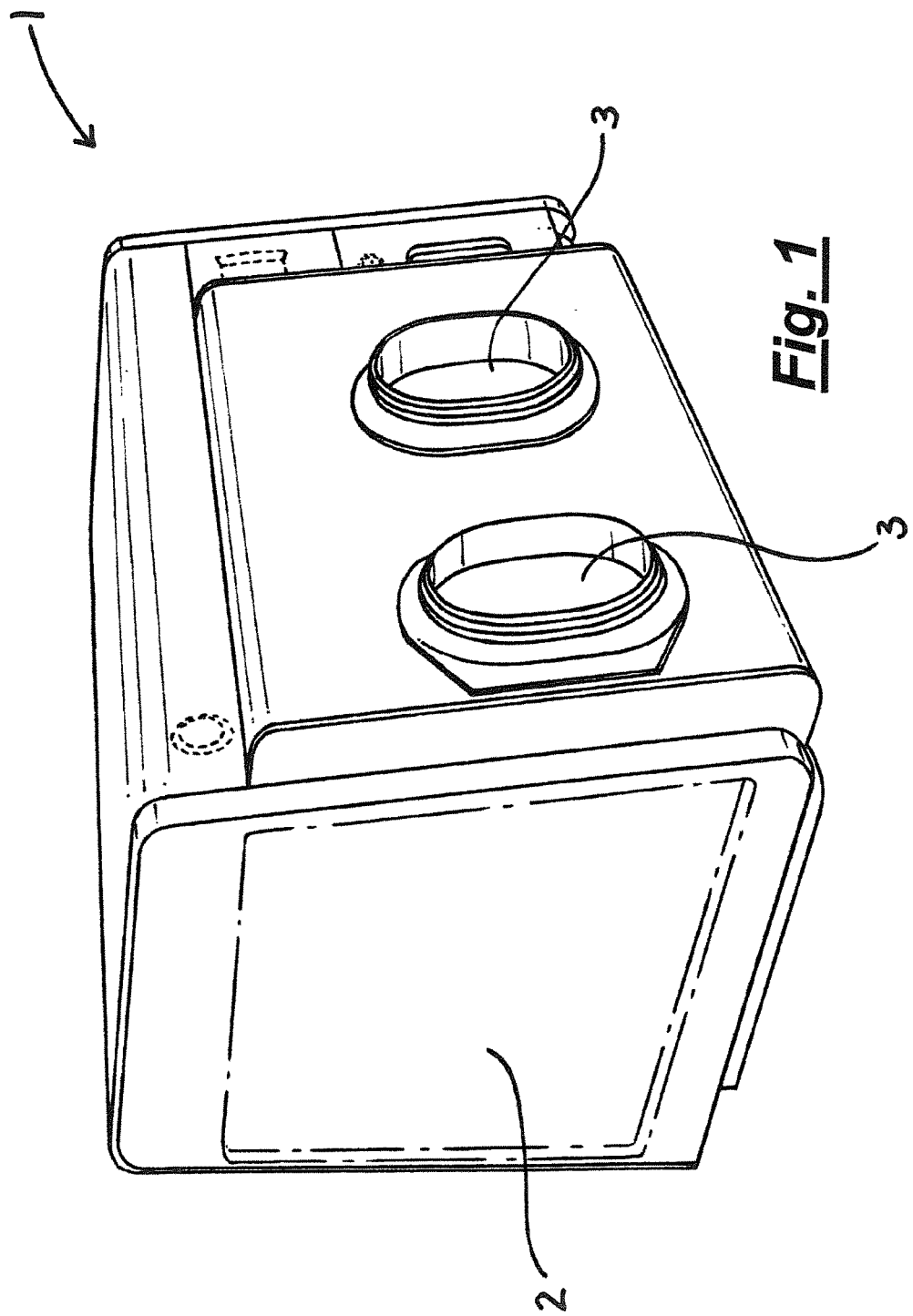
FIG. 1 is a perspective view of a workstation.
Figure 2:
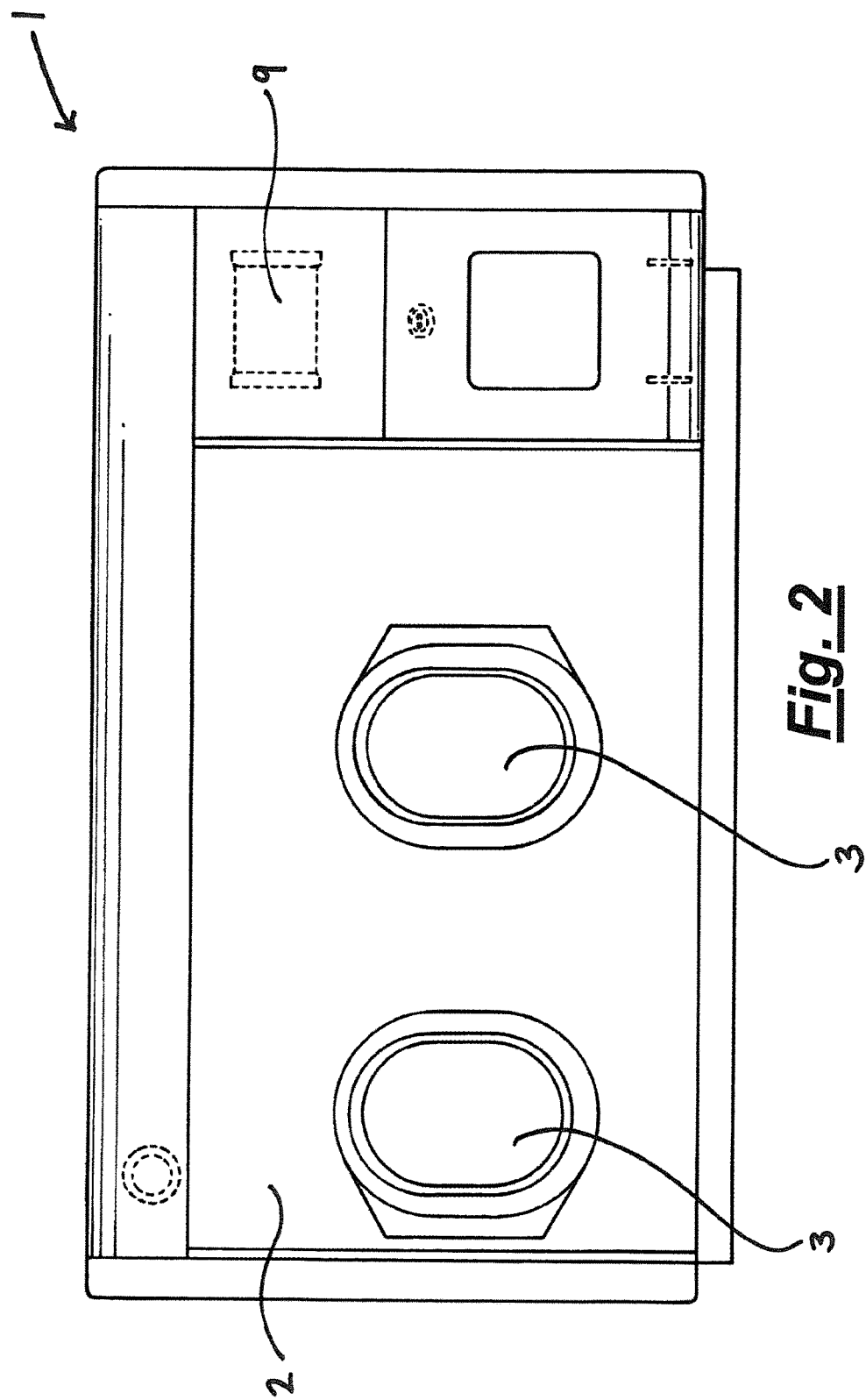
FIG. 2 is a front view of a workstation.

Referring firstly to FIGS. 1 and 2 there is shown in general terms a controlled atmosphere workstation such as an anaerobic workstation 1. Such workstations are generally well-known and need not be described in detail, but they will include a working chamber 2 in which microbiological samples can be held under specific atmospheric conditions and in which certain microbiological operations can be carried out. The chamber is provided with at least one porthole 3 and preferably two or more portholes 3 through which an operator can insert his/her hands in order to carry out operations inside the chamber 2. The manner in which an operator inserts his/her hands into the chamber 2 without compromising the controlled atmosphere will be described in more detail below. Conventionally the workstation 1 is mounted either on a trolley (not shown) or on a work surface so that an operator will stand in front of the workstation 1 and can place his hands through the portholes 3 and carry out operations within the chamber 2 without having to bend or be in an uncomfortable position. The portholes 3 are provided with porthole doors (not shown) that may be opened by an operator to enable access into the chamber 2 of the workstation 1.

It will be understood that the size of the workstation 1, and in particular the number of portholes 3, can take any known form.

The workstation 1 is designed such that the atmosphere within the chamber 2 can be controlled to be something other than ambient. For example, the atmosphere can be controlled in terms of its chemical composition (for example it may be anaerobic), and/or the pressure, temperature and humidity may be controlled so as to be something other than the ambient conditions in the laboratory in which the workstation 1 is located. At the same time it is necessary to enable a laboratory technician to work within the workstation 1 by at a minimum placing and removing samples into and from the workstation and since in some cases it is necessary for a technician to carry out more delicate of complicated procedures within the workstation 1, it is particularly preferred that a technician be able to insert uncovered hands into the workstation 1 so that he or she can properly handle items and carry out any necessary tasks. Of course this needs to be possible without compromising the atmospheric conditions within the workstation 1.

One known way that enables an operator to insert bare hands (and indeed forearms) into the workstation 1 without compromising the atmospheric conditions within the workstation involves the use of sealing sleeves that are secured to a flange extending around the porthole. The sleeves are conventional in design and may be formed of known materials including rubber, or synthetic materials. In use a technician inserts his or her arms into the sleeves the open ends of which are provided with a sealing means that engages the technician's wrists or forearms. Once the technician's arms are received within the sleeves the technician initiates an evacuation/gas refilling cycle in which first all air is extracted from the sleeves and then the sleeves are refilled with a neutral flushing gas. This cycle may be repeated more than once and when completed the technician is able to open the porthole door to provide access to the chamber of the workstation 1 and the technician can insert his or her hands and forearms into the chamber.

Because the technician's arms are within the sleeves during this evacuation/re-filling cycle, some means needs to be provided to allow the technician to start the evacuation/re-filling cycle. Conventionally this is done by operation of a footswitch but the present invention, at least in its preferred embodiments, aims to provide a more convenient and user-friendly alternative as will now be described.

Figure 3:
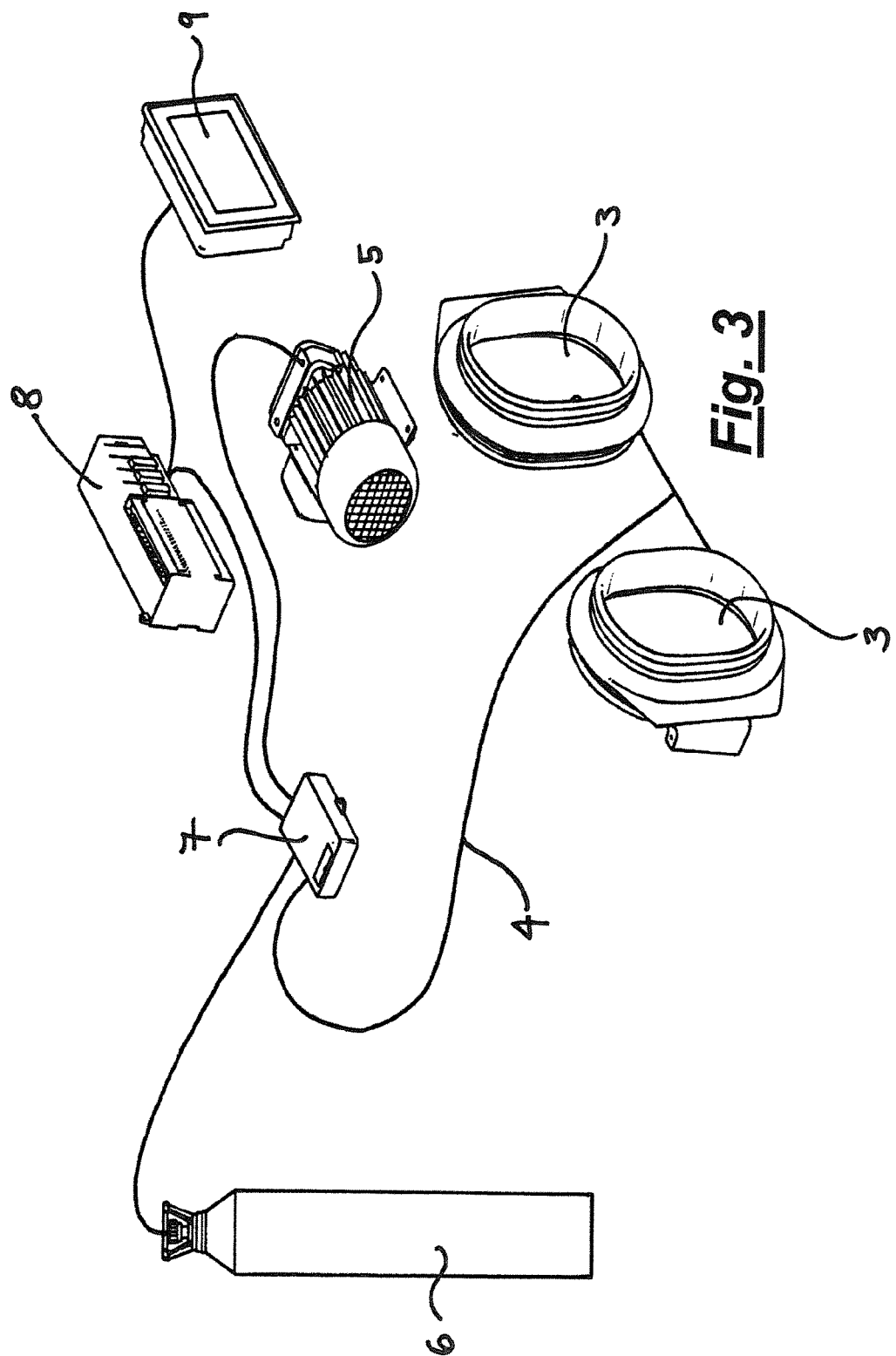
FIG. 3 is a detailed view of the portholes of the workstation of FIGS. 1 and 2.

FIG. 3 illustrates—in a very schematic form—an embodiment of the invention. The portholes 3 are connected to a gas supply/evacuation line 4 that is provided for the purpose of evacuating air from the sleeves, and for refilling the sleeves with a suitable gas as part of a conventional gas evacuation/refilling cycle. The gas supply/evacuation line 4 is part of a gas supply/evacuation system that further includes a vacuum pump 5 for evacuating gas, a gas cylinder 6 for providing a neutral gas for a gas refilling step, a pressure sensor and valve unit 7 for sensing pressure in the system and provided with valves for connecting the line 4 either to the gas cylinder 6 or the vacuum pump 5 as required. The system further includes microprocessor control means 8 and a visual display unit 9. Visual display unit 9 will be provided at a suitable location on the front of a workstation where it can easily be seen by a user as shown for example in FIG. 2. Control means 8 provides control signals to the pressure sensor and valve unit 7 and receives pressure data therefrom.

FIGS. 4(a)-(d) show how the system of FIG. 3 can be used to start and control a gas evacuation/refilling cycle. It should be noted that in these figures the sleeves 11 are shown as if transparent, but this is simply for clarity of illustration so that the hands within the sleeves can be seen. In practice while the sleeves could be formed of a transparent material that is not necessary and may be unlikely.

Figure 4B:
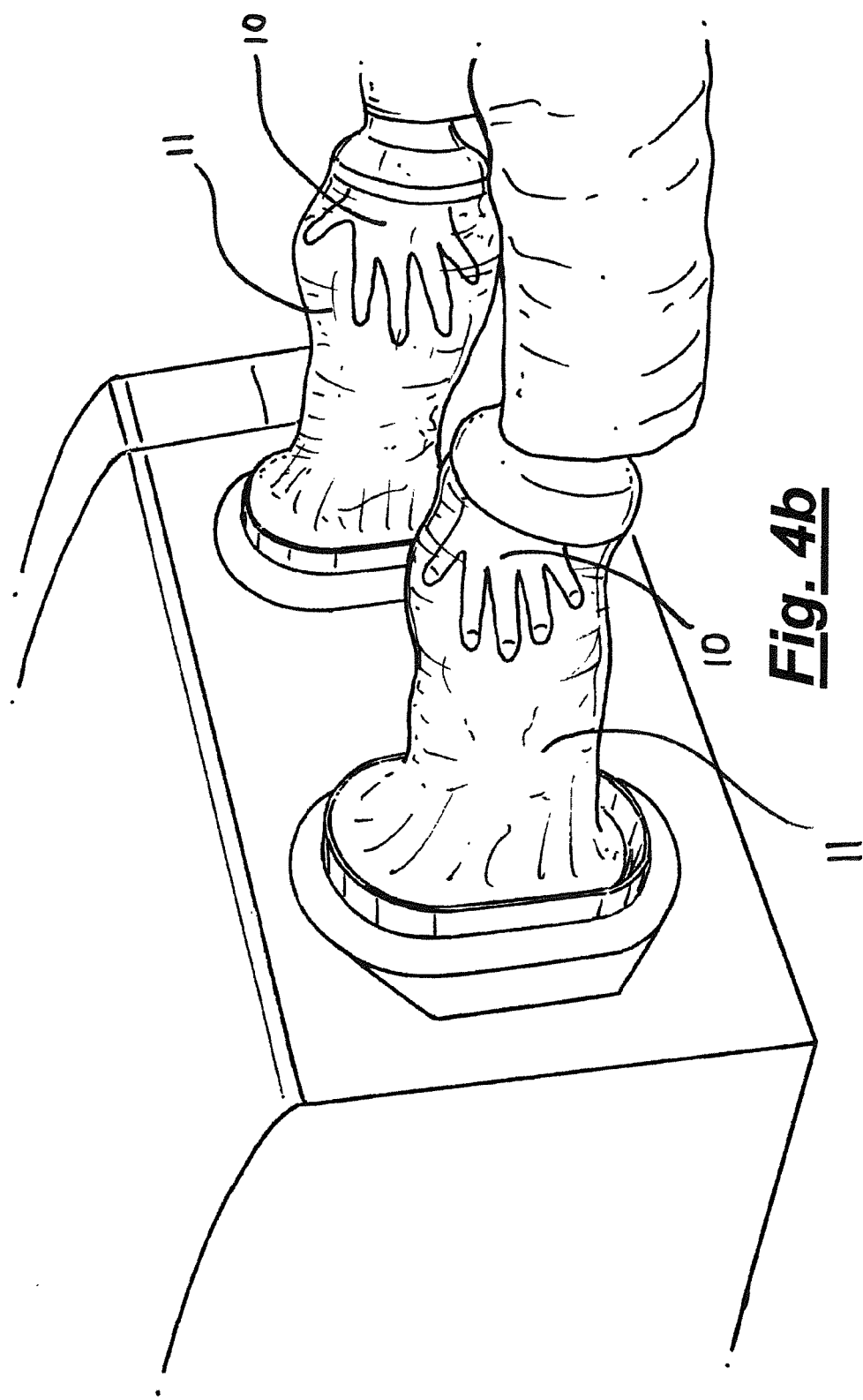
Figure 4C:
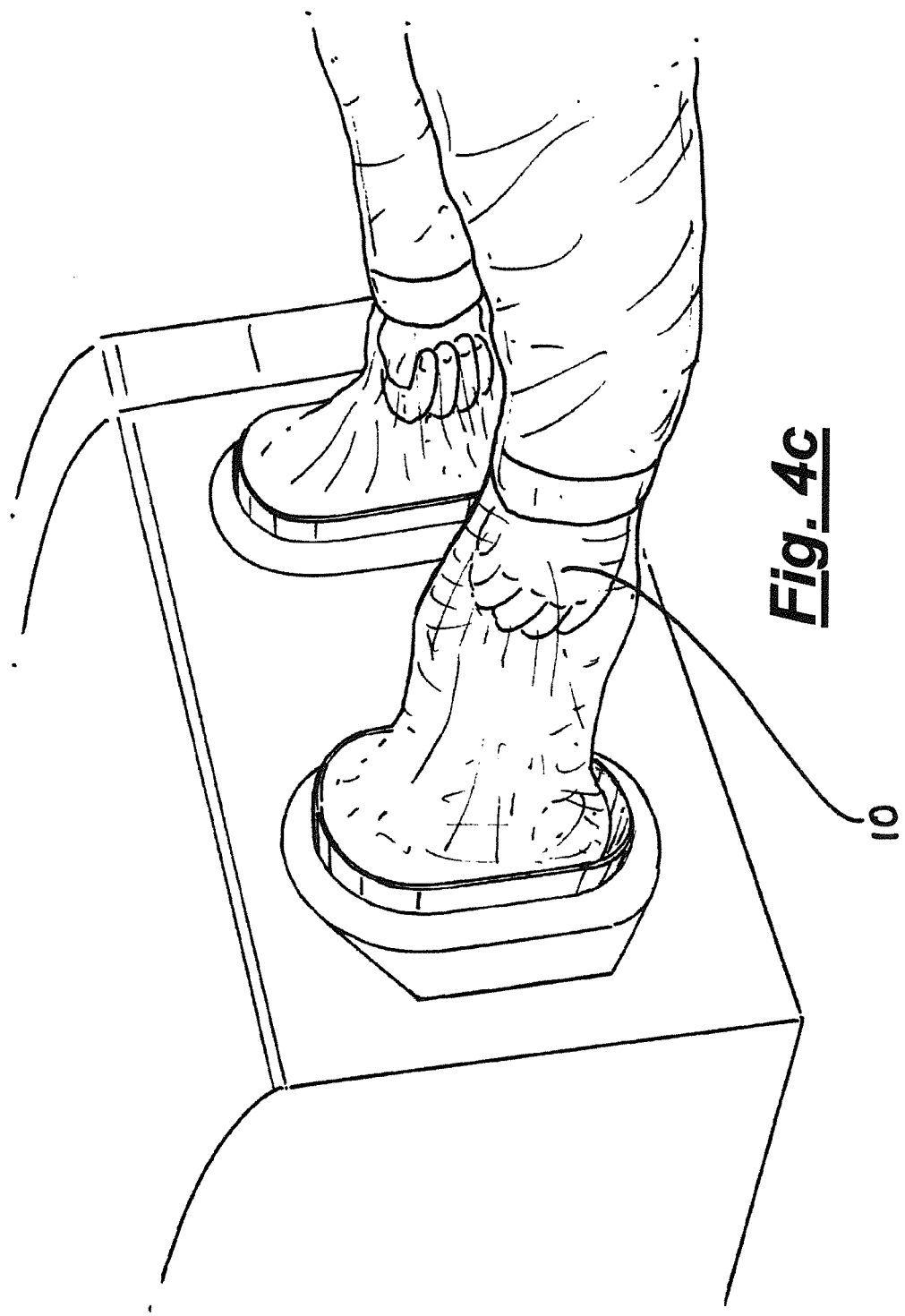

As shown in FIG. 4(a) a user will begin by placing their hands 10 within the sleeves 11 in a conventional manner. The sleeves 11 are formed with sealing means 12 that engage the user's forearms to form a substantially airtight seal around the wrist or forearm. The user may then move their hands away from the portholes 3 such that the sleeves 11 are fully extended away from the portholes 3 while remaining in airtight engagement with the portholes 3 and the wrists or forearms of the user. This position is shown in FIG. 4(b). As shown in FIG. 4(c) the user may then form their hands 10 into a fist and then as shown in FIG. 4(d) will move their fists 10 toward the portholes 3. Doing so will create an increase in the pressure in the line 4 that may be detected by the pressure sensor and valve unit 7. Forming the hands into fists may not be necessary, but doing so causes the increase in pressure to be more clearly defined. This sudden increase in pressure can be used as a signal to indicate that a user is ready to use the workstation 1 and wishes to commence a gas evacuation/refilling cycle before entering the chamber 2. The processing means 8 may, for example, be programmed to recognise that an increase of pressure above a certain level, with the increase taking place within a given short time period, is indicative of the presence of a user ready to commence and the processing means 8 may thus signal the pressure sensor and valve unit 7 to commence a gas evacuation and refilling cycle. It will be important to ensure that a gas evacuation/refilling cycle is not started in error by a false signal and thus the system will preferably be calibrated such that only pressure increases above a predetermined level and/or for a predetermined time will initiate the cycle. As a further precaution, the system may require a user to generate two successive increases of pressure, e.g. by repeating the movement of the fist towards the porthole, and/or may require the increase in pressure to be rapid which could only be caused by a rapid movement of the hands of the user, preferably in the form of fists, towards the porthole. Once the gas evacuation/refilling cycle has commenced this will be displayed on the visual display unit 9 which will show the status of the cycle and will indicate to the user when the cycle has been completed the portholes 3 may be opened.

It will thus be seen that the system is capable of detecting that a user is ready to commence using the workstation 1 and that a gas evacuation/refilling cycle should be initiated. This is done by detecting the presence of a user's hands within the sleeves by detecting a pressure change in the system. It is, however, also possible to detect the presence of a user's hands in other ways. For example, a user may wear a wrist band in which is incorporated some element that may be detected. For example, a magnet or an RFID chip which may be detected by an RFID or magnetic sensor located at the porthole. The sensor may then send a signal to the processing means which in turn may initiate a gas evacuation/refilling cycle. To avoid accidental initiation of a cycle the system may require the sensed element, i.e. the magnet, RFID chip or the like, to be held within sensing range for a predetermined period of time.

It will thus be understood that at least in preferred embodiments of the invention there is provided a controlled atmosphere workstation in which a gas evacuation/refilling cycle can be initiated by a user in a particularly simple and convenient manner.

The invention claimed is:

1. A controlled atmosphere workstation comprising:
   a chamber,
   at least one porthole that may be opened for enabling a user to access the chamber, a sleeve secured to the said at least one porthole, said sleeve being adapted in use to receive a hand of the user and to engage a forearm of the user,
   a system for evacuating the sleeve prior to opening the at least one porthole, and
   pressure sensing means for detecting changes in air pressure in a vicinity of said at least one porthole when said hand within the sleeve is moved towards said at least one porthole, and wherein operation of said sleeve evacuation is initiated by detecting a change in said pressure due to movement of said hand within the sleeve towards said at least one porthole.

2. The workstation as claimed in claim 1 wherein said sleeve evacuation system is initiated by detecting the change in said pressure is above a predetermined level and/or within a predetermined time interval.

3. A method for initiating a sleeve evacuation process in a controlled atmosphere workstation comprising a chamber, at least one porthole that may be opened for enabling a user to access the chamber, and a sleeve secured to the said at least one porthole, said method comprising:
   placing a hand of the user within said sleeve with the sleeve engaging the forearm of the user, and
   initiating the sleeve evacuation process in response to detecting a pressure change in a vicinity of said at least one porthole when said hand within the sleeve is moved towards said at least one porthole.

4. The method as claimed in claim 3 wherein said sleeve evacuation process is initiated by detecting the change in said pressure is above a predetermined level and/or within a predetermined time interval.

\* \* \* \* \*